United States Patent [19]
Russell, Jr. et al.

[11] 3,868,823
[45] Mar. 4, 1975

[54] CONCENTRATOR, METHOD, AND SYSTEM FOR UTILIZING RADIANT ENERGY

[75] Inventors: John L. Russell, Jr., La Jolla; Eugene P. DePlomb, San Diego, both of Calif.

[73] Assignee: Gulf Oil Corporation, San Diego, Calif.

[22] Filed: Apr. 6, 1972

[21] Appl. No.: 241,522

[52] U.S. Cl. .................. 60/641, 126/270, 350/294
[51] Int. Cl. ................................................ F03g 7/00
[58] Field of Search ......... 60/26; 126/270; 350/293, 350/294

[56] References Cited
UNITED STATES PATENTS

| | | | |
|---|---|---|---|
| 658,195 | 9/1900 | Tudor | 126/271 |
| 2,182,222 | 12/1959 | Courtis et al. | 126/270 |
| 2,945,417 | 7/1960 | Caryl et al. | 126/270 |
| 2,976,533 | 3/1961 | Salisbury | 126/270 UX |
| 3,182,654 | 5/1965 | Culling | 126/270 |
| 3,203,167 | 8/1965 | Green | 126/270 |

FOREIGN PATENTS OR APPLICATIONS

| | | | |
|---|---|---|---|
| 325,179 | 2/1930 | Great Britain | 126/270 |
| 517,417 | 2/1931 | Germany | 126/270 |

*Primary Examiner*—Edgar W. Geoghegan
*Assistant Examiner*—H. Burks
*Attorney, Agent, or Firm*—Fitch, Even, Tabin & Luedeka

[57] ABSTRACT

A concentrator having surfaces which reflect substantially parallel incident rays to a focus line which moves in response to a change in angle of the incident rays and a method and system for utilizing the same are set forth.

60 Claims, 17 Drawing Figures

PATENTED MAR 4 1975 3,868,823

CONCENTRATOR, METHOD, AND SYSTEM FOR UTILIZING RADIANT ENERGY

The present invention relates to a method and system for utilizing radiant energy, and more particularly relates to a concentrator, method and system for concentrating rays emitted from an energy source and deriving work from the heating effect of the concentrated rays.

The use of radiant energy in the derivation of work for various industrial purposes is generally known in the art. This use centers mostly around devices that focus or concentrate the energy and then utilize the heating effect to derive useful work.

For example, various multiple mirror concentrators have been constructed in such a manner as to reflect solar rays onto a fixed target. Because of the relative movement between the earth and the sun, the angles of the incident rays from the sun upon the mirrors continuously vary. To accommodate this continuous change, the multiple mirrors have heretofore taken the form of various movable arrangements and have been coupled with various control means to cause the movable mirror arrangement to automatically track the sun as the earth rotates. Multiple mirrors, of course, require multiple mountings, which when movably arranged require coordination and alignment. Moreover, the multiple mirrors are generally segments comprising increments of a curve which together form a specific curved surface, such as a paraboloid. Hence, the individual mirror segments may differ from one another, frustrating the advantage of mass production of all segments. Because of the relatively large area from which the sun's rays must be reflected and concentrated to produce sufficient heating for the derivation of effective industrial work, an enormous number of individual mirror segments is required. Thus, providing the mirrors alone for a movable arrangement is costly. On the other hand, a single large mirror to accomplish the same result would be heavy and fragile, making a movable arrangement cumbersome and difficult to accommodate.

In short, the commercial development of mirror arrangements for the utilization of solar energy for industrial purposes has been found to be economically impractical, and prior art devices do not appear to have offered a satisfactory solution. Mirrors large enough to produce suitable results in the prior art devices have been fragile, unwieldly, and awkward, and the substitution of other materials for glass on the reflective surfaces has not mitigated the difficulties attendant with these devices.

Because of the increasing consumption of electrical power, particularly when considered with increasing costs of generating the electrical power, it has become desirable to intensify the activity of developing heretofore uneconomical or apparently impractical methods of deriving useful work from concentrated radiant energy, including the harnessing of solar energy for the production of electrical power.

It is known that the load demand for electrical power is unsteady, and large peak loads occur from time to time. For example, in the summer in certain regions of the country a heavy load demand is created by air conditioning, particularly during the peak heat of the day. This peak heat usually coincides with maximum sunlight. It would be desirable, then, to take advantage of the very sunlight which creates the need for the load demand to implement the production of power to fulfill the demand, particularly if a system utilizing the sun's rays to generate power could be less expensive than known generating means of equivalent capacity. Usually, it is necessary to fortify the output of a power station with a back-up system of standby equipment, personnel, and fuel. Thus, a solar plant employing a relatively inexpensive and effective reflecting means for collecting and concentrating solar rays and a method and system for generating electrical power utilizing the reflecting means could be a boon to industry in general.

Augmenting existing generating facilities could be particularly advantageous in the instance of a generating facility that, except for seasonal peaks, has a low load factor operation. Further, it is conceivable that a solar power production system alone could supplant known power production systems.

Decomposition of water into $H_2$ and $O_2$ without the use of electricity to make hydrogen available for the energy market is another example of useful work that may be derived from concentrated solar energy. Further examples are industrial metallurgical processes and the gasification of coal and oil.

It is an object of the present invention to provide an improved system for concentrating radiant energy to derive useful work for commercial and industrial purposes.

It is another object of the present invention to provide a method of concentrating the rays from the sun and utilizing the effective heat therefrom for such purposes as the production of electrical power in a relatively inexpensive manner, the decomposition of water, metallurgical processes, and the gasification of coal and oil.

It is yet another object of the present invention to provide a concentrator which has a primary reflector that is fixed during reflecting and that is arranged to converge rays along a linear focus regardless of the incident angle of the rays and which may include a secondary reflector for further concentration of the converged rays.

It is yet another object of the present invention to provide a system for the utilization of solar energy in the production of electrical power wherein a portion of the generating system is continuously positioned so as to always be in coincidence with a line of focus movable in response to the movement of the sun.

These and other objects of the invention are more particularly set forth in the following detailed description and in the accompanying drawing of which:

Figure 1:
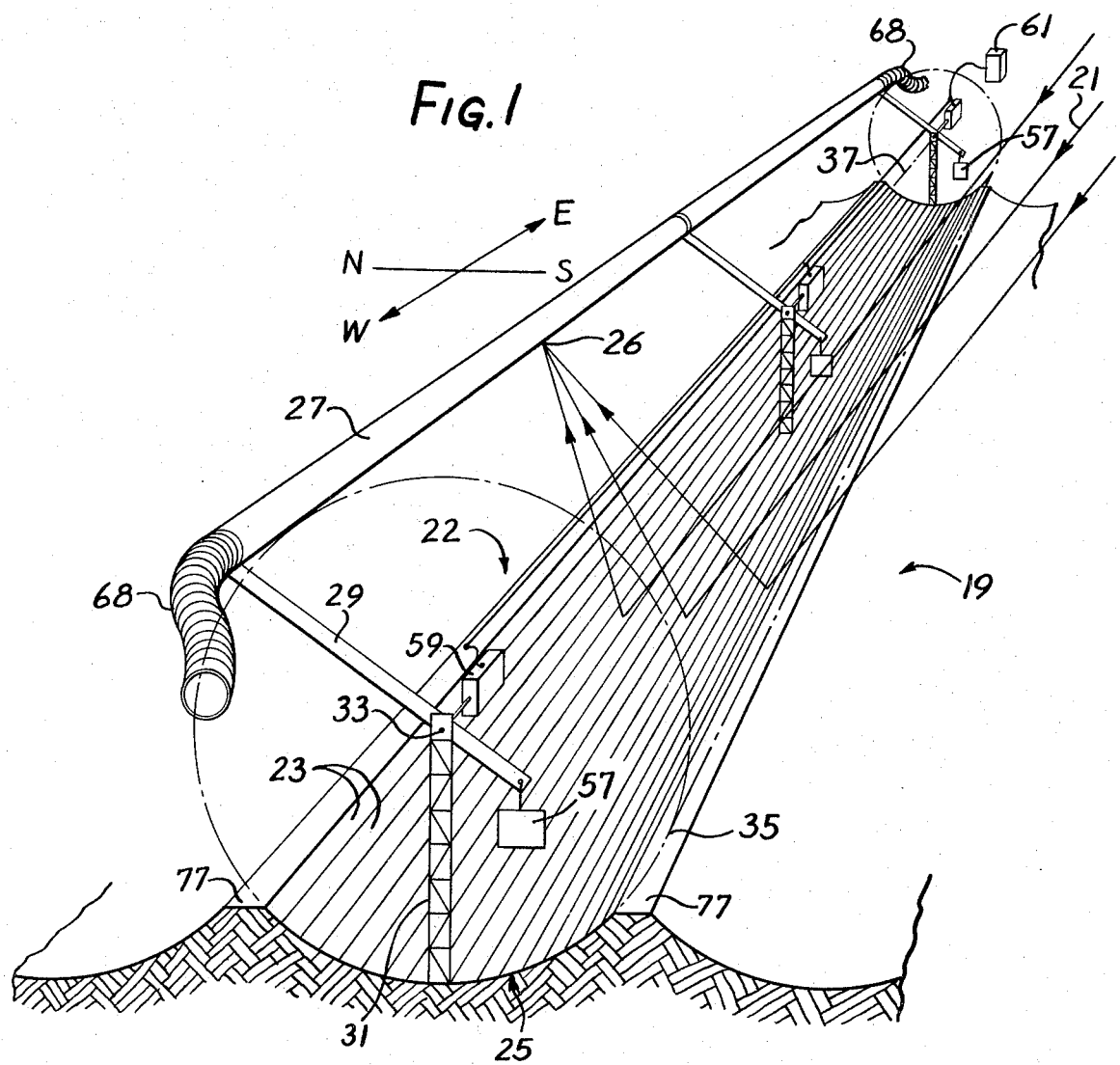
FIG. 1 is a pictorial perspective view of a concentrator in accordance with a preferred embodiment of the present invention along with a cylinder of reference illustrated in phantom.

Very generally, a concentrator is set forth for concentrating the heating effect of rays emitted from a source of energy, such as the sun, which moves in a path that may or may not be predictable. The concentrated heat is then available for performing useful work, such as in industrial metallurgical processes, production of hydrogen and oxygen from water, gasification of coal and oil, and in the generation of electrical power. The concentrator is shown in the drawings for purposes of illustration and description for use with the sun as the source of energy. Further, the work derived from the concentrated heat is shown and described in connection with a system for the production of electrical power. However, the concentrator is by no means limited for use with the sun as a source of energy, nor the system for the production of electrical power. On the contrary, the concentrator is clearly useful for concentrating rays in general, and the system is useful for employing the concentrated heating effect of rays for process heat in general. Further, the reflector of the concentrator is useful for concentrating rays that do not have substantial heat energy, where such concentration is desirable.

The method of concentrating rays may best be understood by reference to the drawings in which a preferred embodiment of a concentrator is illustrated and in which a system employing the concentrator and utilizing the concentrated heat in the production of electrical power is illustrated.

Referring first to FIG. 1, a concentrator 19 has a reflector 22 which intercepts and reflects incoming rays 21. The reflector 22 comprises a plurality of reflective surfaces in the form of longitudinally disposed slats 23 adjacent each other and arranged on the surface of an arcuate base 25. As will be seen in detail hereinafter, the slats 23 cause the reflected rays to converge at a focus 26. A target in the form of a pipe 27 is provided coincident with the focus to receive the converged rays. The pipe 27 is mounted on a plurality of radial arms or beams 29 which themselves are rotatably connected to a plurality of vertical supports or towers 31 at pivot points 33. Thus, the pipe 27 is movable along a portion of the upper surface of a reference cylinder 35 generated about an axis 37. The radius of the cylinder is the radius of curvature of the arcuate base 25. The axis 37 contains the pivot points 33.

The slats 23 are disposed in a specified relationship both with respect to each other and with respect to the axis 37. As will be seen in detail hereinafter, each of the slats 23 is inclined laterally with respect to a given plane containing the axis 37. Preferably, the given plane is horizontal. The inclination is such that the rays 21 incident upon the slats are reflected to converge on the focus 26 regardless of the angle of incidence of the rays 21. It is known from basic physics that the angle of incidence is equal to the angle of reflection. Thus, it can be seen that as the angle of incidence of the rays 21 varies, the focus 26 upon which the reflected rays are caused to converge must move in response to the varying angle. The particular disposition of the slats 23 is predetermined to cause the path which the focus 26 follows to lie on a portion of the upper surface of the reference cylinder 35. By means hereinafter described, the target or pipe 27, which is mounted to move along the same path that the focus moves in, is synchronized to move in coincidence with the focus as the focus moves in its predetermined path. Thus, the pipe is enabled to receive the heating effect of the concentrated rays even though there is relative movement between the concentrator and the source of energy.

The present application is also concerned with converting the concentrated heat of the concentrator 19 to useful work. For example, a system is described herein employing steam as the working fluid. When the sun is available as the energy source, water is boiled in the pipe 27 by the heat from the concentrated solar rays. The resulting steam is used both to turn a turbine and to heat a pebble bed for the storage of a reserve supply of energy. When the sun is not available as the energy source, the pebble bed then supplies heat to make steam for the turbine.

Figure 2:
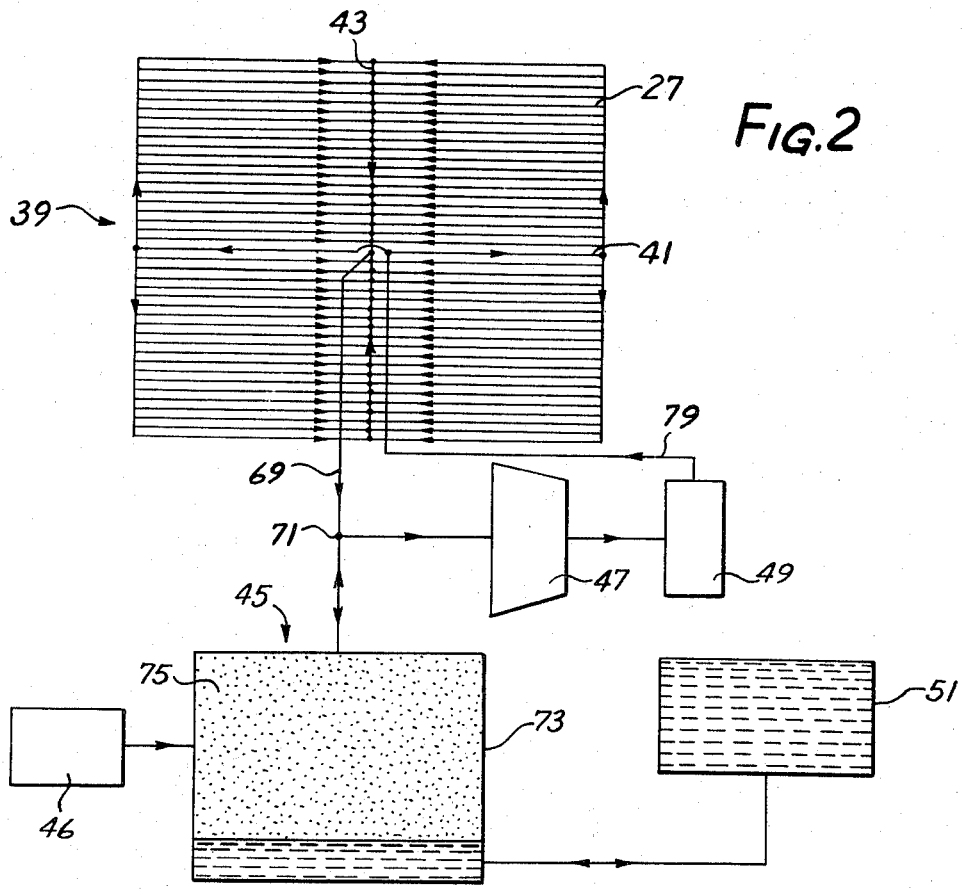
FIG. 2 is a schematic representation of a system for extracting useful work from the concentrator of FIG. 1.

There is shown in FIG. 2 a preferred embodiment of a system according to the present invention for utilizing the concentrator 19 in the production of electrical power. Briefly, a plurality of such concentrators are connected in a network 39 wherein the pipes 27 serve as boiler tubes as they are continuously positioned to collect the heating effect of the converged rays. A water line 41 is common to one end of the pipe 27, and a steam line 43 is common to the opposite end of the pipes. Steam flows to a pebble bed 45, for storage of a reserve supply of heat, and through a conventional steam turbine 47, where it performs work in driving the turbine. The turbine in turn drives a generator for the production of electrical power. The generator and other parts of the generating plant are conventional and are not illustrated. After expanding and causing mechanical rotation of the turbine 47, the spent steam that emerges from the turbine flows to a condenser 49 where it is cooled and thereby precipitated as water. The water then flows in the water line 41 to recirculate through the system. A water reservoir 51 is used as a water supply.

An inherent difficulty encountered when utilizing solar energy for the production of useful work is the lack of continuous availability of the sun as the energy source. This difficulty is resolved in the present system by the use of the pebble bed 45. Storage of heat in the pebble bed provides a reserve energy source for the system operation at night and during periods of inclement weather. In regions where extended periods of inclement weather are anticipated, a provision is made for heating the pebble bed with a fossil fuel operated furnace 46.

Figure 3:
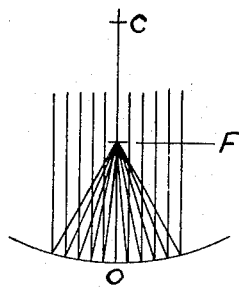
FIG. 3 is a diagrammatic view illustrating rays reflecting from a typical concave spherical reflective surface, and particularly depicting the relation between the center of curvature of the surface and the focal point of the reflected rays.

More specifically, the concentrator 19 of FIG. 1 comprises a primary reflector formed on the arcuate base 25. If this reflector were to be a conventional concave spherical surface as illustrated in FIG. 3, the angle of reflected rays would be dependent upon the slope of the curve at the point of reflection. Assume the line OC is the principal axis of the curve. It is well known in the art that rays impinging on a reflective surface parallel to the principal axis will be reflected to converge at a common point of focus. Thus the image is at F in FIG. 3. The point C is the center of curvature. In this illustration, the length of OF is one-half that of OC. Prior art devices for the concentration of solar rays have utilized this principle by disposing a stationary receiver at the focus and making the reflective surface movable to respond to the changing angle of the sun. The principle of the heliostat is employed to control the movement of the mirror and cause it to track the path of the sun. Many prior art devices, to achieve flexibility, have divided the reflective surface into segments of increments of the curve of the surface. Whether the prior art device utilizes a reflector having a continuous surface or one having a plurality of segments comprising the surface, the physical concept of reflecting the rays is the same.

In accordance with the preferred embodiment of the present invention, the primary reflector 22 of the concentrator 19 is generally conformed to the arcuate shape of the bed 25, but it is divided into a plurality of segments, each having a flat surface. These segments are in the form of the slats 23, each of which has its reflective surface facing the interior of the reference cylinder 35 and is inclined laterally at a predetermined angle with respect to the horizontal. The slats lie generally parallel to the axis 37. The angle of the reflected ray is dependent upon the inclination of the slats and not on the slope of the general curve, at the point of reflection, on which the slats are arranged. Although in the illustrated embodiment, the slats 23 are inclined with respect to the horizontal, this specific orientation is illustrative only. The slats could be related to any given plane as long as the other portions of the concentrator are related to the same given plane. Such relation is described in detail hereinafter.

Figure 4:
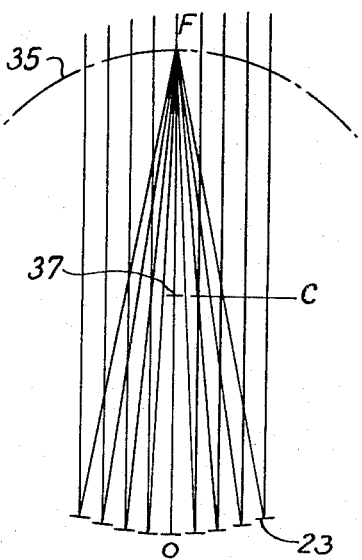
FIG. 4 is a diagrammatic view illustrating rays reflecting from a reflector of the concentrator of FIG. 1, and particularly depicting the relation between the center of curvature of the arrangement of a plurality of reflective surfaces comprising the reflector and the focal point of the reflected rays.

The result of this arrangement is seen in FIG. 4. When contrasted with FIG. 3, the departure from such prior art devices is readily apparent. In FIG. 4, it will be noted that the segments 23 are arranged adjacent one another along the lower surface of the reference cylinder 35. Each slat is independently inclined with respect to the horizontal, and rays parallel to the principal axis OC of the curve are reflected by the slats 23 to converge at a focus F, which lies on the upper surface of the reference cylinder 35. If C, which is the center of curvature, is assumed to be the axis 37 of the cylinder 35, then the focal length of F is twice the length of OC. Consequently, OF becomes a diameter, and in the present instance, it is the diameter of the reference cylinder 35. By substituting the focus F of FIG. 4 for the focus 26 of FIG. 1, it may be seen that the focal length of the primary reflector 22 of the concentrator 19 is twice the radius of curvature, as contrasted with a focal length of one-half the radius of curvature where a smooth surface (FIG. 3, as in prior art devices) is used.

Figure 5:
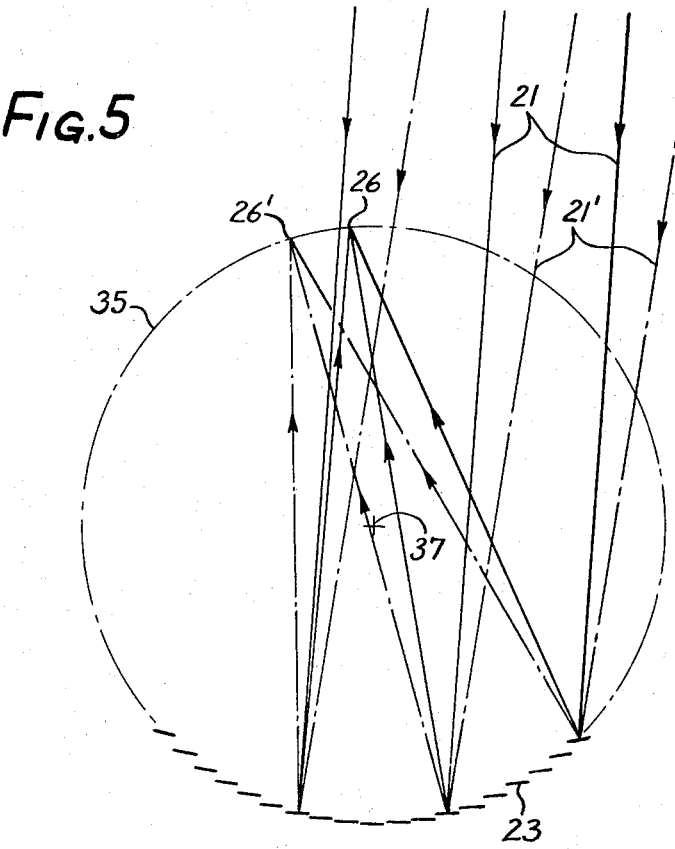
FIG. 5 is a diagrammatic view illustrating the converging of rays by the primary reflective surfaces of the concentrator of FIG. 1 and the location of a focus of rays having one incident angle and of a focus of rays having a different incident angle.

In FIG. 5, it is noted that the slats 23 of the concentrator 19 are disposed in a fixed relationship both with respect to one another and with respect to the axis 37 of the reference cylinder 35. Incident rays 21 are shown being reflected and converged at the focus 26 on the upper surface of the reference cylinder 35. Incident rays 21', having a different angle of incidence from the rays 21, are illustrated as being reflected by the same slats, but they are converged at a focus 26'. It is noted further that the focus 26' also lies on the upper surface of the reference cylinder 35. It will be understood that incident rays having different angles from those illustrated also converge at a focus on the surface of the reference cylinder.

Figure 7:
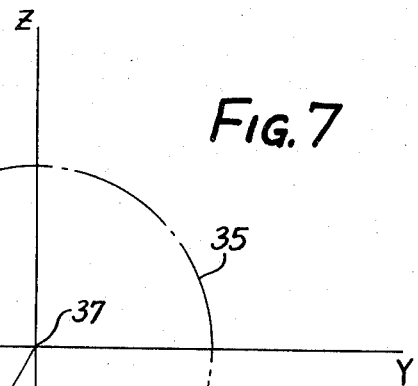
FIG. 7 is a graphical representation of the disposition of each primary reflective surface of the concentrator of FIG. 1.

A detail of the specific disposition of the slats 23 that causes the reflected rays to converge at a focus on the surface of the reference cylinder is seen in FIG. 7. There a graph depicts the reference cylinder 35 and its axis 37 in respect to coordinate axes Y (horizontal) and Z (vertical). The X axis is assumed to be coincident with the axis 37 and is perpendicular to the Y and Z axes and thus horizontally disposed. A single slat 23 is illustrated on the graph in a position along the lower surface of the reference cylinder 35. The given plane of reference is a horizontal plane containing the XY axes. Assume an angle $\theta$ between a line drawn from the axis 37 to the center of the width of the slat and a plane containing the axis 37 normal to the given plane. In this instance, the given plane, as mentioned previously, is horizontal and contains the XY axes. Thus, a plane normal thereto containing the axis 37 is a vertical plane containing the XZ axes. The slat 23 is then inclined with respect to a horizontal line H (on the graph of FIG. 7) parallel to the Y axiz and inwardly toward the axis 37 by an angle equal to one-quarter of $\theta$. All of the slats are disposed in this manner. Further, by taking the vertical plane containing the axis 37 as a median plane for purposes of symmetry, then for each slat 23 disposed on one side of the median plane, there is a slat in a correlative position on the opposite side of the median plane.

Figure 8:
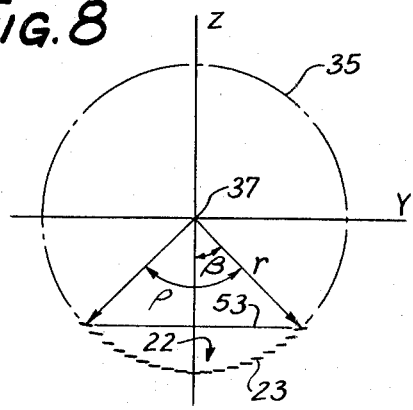
FIG. 8 is a graphical representation of the cylinder of reference of FIG. 1 enlarged to illustrate the relationship of the arrangement of the primary reflective surfaces of the concentrator to the axis of the reference cylinder.

Referring now to FIG. 8, it will be seen that the slats are disposed on the lower surface of the reference cylinder 35 equally on either side of the Z axis on an arc subtending an angle β. In the preferred embodiment of the present invention, β is 45°. Therefore, the slats are disposed on a total arc of 90° (angle ρ) of the lower surface of the reference cylinder 35. It should be understood that other angles, either less than a total arc of 90° or up to approximately 180°, may be used in forming the primary reflector 22.

It can be proven that an arcuate arrangement of reflective slats having the foregoing disposition of each slat will result in a reflective surface having a focal length of twice the radius of curvature and further, that the focus will move along the upper surface of the reference cylinder on a portion generally opposite the portion of the same cylinder on which the arcuate arrangement, i.e., the primary reflector 22, is disposed. It was stated previously that the diameter of the reference cylinder is twice the radius of curvature of the reflector 22.

It will be understood that although the slats 23 are preferably fixed in their positions, this need not preclude the structuring of the slats so that they are movable to, for example, sharpen the focus. It is during the reflecting that the slats 23 are preferably retained in a fixed disposition.

Predetermining the path of focus to be along the surface of a cylinder as described in the foregoing simplifies the mechanics of accommodating the receiver pipe 27 and making it movable in coincidence with the focus. The details of the structure will vary in accordance with the intended use of the reflector 22. A free standing structure (not shown) supporting the reflector 22 and the pipe 27 is suitable for a smaller scale operation, as well as an experimental purpose or laboratory use. The given plane of reference for the slats mentioned previously may be other than horizontal. However, it will be appreciated that to be suitable for producing a sufficient amount of electrical power from solar energy in practical terms, an enormous amount of rays must be concentrated. Hence, an inexpensive reflector on an area basis is desirable, and a natural arcuate base 25 is preferable to a free standing structure to accommodate the reflector 22. The earth is one such natural base, and conventional earth moving equipment may be adapted to carve out the proper shape for the reflector bed.

To illustrate a few dimensions of the preferred embodiment of the system of FIG. 2, the pipes 27 in one quarter of the network 39 are 750 feet long, and the width of the reflector 22 for each pipe is approximately 28 feet. Referring to FIG. 8, as used herein the width of the reflector 22 is defined as the length of the cord 53 of the total reflector arc. This width is computed by determining the length of a cord subtending an angle ρ of a circle having a radius r, by the formula $L = 2r \sin(\rho/2)$. In the present instance, the radius of the circle is the radius of the reference cylinder 35 and is 20 feet. The reflector 22 subtends the angle ρ, which is equal to 2β or 90°. The sine of one-half 90°, or 45°, is equal to 0.707. Thus, substituting these values in the foregoing formula:

$$L = 2 \times 20 \times 0.707 = 28.28 \text{ feet}$$

Conventional civil engineering practices are followed in the preparation of the ground. For example, the ground is graded and then tamped. Provisions are made for drainage appropriate to the local climate and suitable for accommodating any cleaning chemicals which are required periodically to maintain the surface reflectivity. After ground preparation, a supporting bed of asphalt is laid, and then a reflective metallic foil is hot pressed into the surface of the asphalt. As mentioned previously, the earth moving equipment may be adapted for producing the desired shape of the reflector bed. This adaptation may be the modifying of the blade of a conventional road grading machine. Similarly, the asphalt applying equipment may be adapted to conform the asphalt to the reflector bed.

It will be noted in FIG. 1 that the orientation of the concentrator 19 is preferably in an east-west direction. The long dimension of the slats 23 is parallel to this direction. The width of each slat is coordinated with the width of the pipe 27 and may be best seen in FIG. 6. For optimum efficiency it is desirable that all rays reflected from each slat be converged within the width of the pipe 27. If the incoming rays were all parallel to each other and the reflective surfaces were infinitely narrow, the reflected rays could be directed to a focus which would be infinitely narrow. The fact is, however, that the focus or image does have a measurable width caused primarily by the width of the source of rays, the sun. It is known in the art that the diameter of the sun subtends an arc with respect to a point on the earth of approximately ½°. Thus, the rays from either side of the sun converge at a given point on the earth at an angle of approximately ½°, and when these rays are reflected, the relationship between the reflected rays remains unchanged. They diverge from each other at the same angle at which they converged on the point of reflection.

Figure 6:
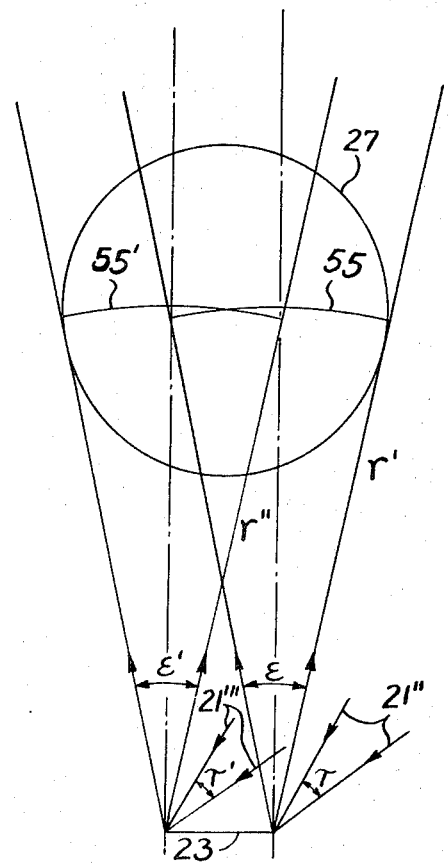
FIG. 6 is a diagrammatic view depicting a comparison between two portions of the concentrator of FIG. 1 with the ray angles exaggerated for clarity of illustration.

The relationship between incident rays is retained in the reflected rays because the angle of incidence of each impinging ray with respect to the reflective surface is equal to the angle of the impinging ray's reflection. No relative change between rays occurs. Thus, as seen in FIG. 6, the incoming rays 21″ converge at one end of the slat 23 by an angle τ and are reflected to diverge therefrom by an angle ε, both angles being in this instance approximately ½°. Based on this approximation, the length of the arc 55 may be determined. It is known in the art that a radian is a unit of plane angular measurement equal to the angle at the center of a circle subtended by an arc equal in length to the radius of the circle. Further, it is known that one radian equals approximately 57.3°. Thus, is the angle ε were 57.3°, then the length of the arc 55 would be equal to the length of the radius r′. By determining what fraction of a radian the angle ½° is, the length of the arc 55 may be approximated.

As mentioned previously in connection with FIG. 8, the radius r, which is also the radius of the reference cylinder 35, is 20 feet. The distance from the reflective surface through the axis 37 to a point opposite on the cylindrical surface is then, of course, 40 feet, the diameter of the cylinder. Since the pipe 27 lies somewhere on the cylindrical surface generally opposite the primary reflective surface, r′ of FIG. 6 equals approximately 40 feet. Converting ε to radians:

$$\tfrac{1}{2}° \times 1/57.3° = 0.00872 \text{ radian}$$

Then the length of the arc 55 in inches equals:

0.00872 × 40 × 12 = approx. 4 inches

Hence, even if each slat 23 were essentially only a line of reflection, the pipe 27 would have to be approximately 4 inches in diameter to receive all the reflected rays.

Each slat, however, has a continuum of points of reflection across its width, but only the extremes are considered for this purpose. At the other side of the slat, incident rays 21''' converge at an angle τ' and are reflected to diverge at an angle ε', both angles again being approximately ½°.

The pipe 27 is to be coterminus with the outer most rays of the angles ε and ε'. The width of the slat 23 is added to the basic four inch diameter shown in the foregoing to be a minimum for the pipe in a 40 foot diameter concentrator. Stated otherwise, the arcs 55 and 55' would coincide if the slat 23 were a line. A pipe 27 to be coterminus with the arcs would then have a diameter of approximately 4 inches. Any width of the slat 23 moves the two arcs apart and out of coincidence with each other. This width is added to the basic 4 inch diameter of the pipe 27. Thus, if each slat 23 is two inches wide, the diameter of the pipe 27 in a 40 foot diameter concentrator is approximately 6 inches. Other dimensions could be used within this principle, and these recited are not intended as limitations.

As mentioned previously, a metal foil is hot pressed into the asphalt surface to form the reflector 22. The foil conforms to the specially prepared shape of the reflector bed 25. The material used for the reflective surface preferable has high reflectivity and durability. A significant factor affecting durability is the requirement for frequent washing of the surface. Of course, the frequency may vary with the specific geographical region in which the concentrator 19 is located. Preferably, the reflectivity exceeds 90 percent. Preferred materials for achieving these requirements may comprise a combination of a thin metal foil processed by depositing a vapor of aluminum or silver thereon and then covering with a durable material such as a thin film of glass. Another metal foil processed by electro polishing and the deposition of chromium may also provide a durable surface, but its reflectivity is approximately 62 percent of the incident energy. Other suitable materials may be used for this purpose.

The pipe 27 is mounted for support and movement that allows it to move in coincidence with the focus 26 as the focus moves in its predetermined path along a portion of the upper surface of the reference cylinder 35. As may be seen in FIG. 1, the pipe 27 is supported by a plurality of radial arms or beams 29. The beams are rotatably mounted at pivot points 33 on a plurality of supporting towers 31. These towers may be supported in a conventional manner in the earth and then extend vertically through the reflector 22.

Preferably, the moment of forces about the pivot points 33 are balanced. This is accomplished in the preferred embodiment by providing beams 29 that are approximately 30 feet long. The length of each arm between the mounting 33 and the pipe 27 is approximately 20 feet, which, as mentioned previously, is the radius of the cylinder 35. Each beam 29 extends beyond pivot point 33 by 10 feet. On the extended end is hung suitable counter weights 57. Suitable gears and bearings (not illustrated) are included at each mounting point 33 between each beam 29 and its tower 31.

When properly balanced, the pipe 27 will retain any rotative position to which it may be placed. Thus, little force need be exerted to cause its movement.

The motive force for causing the rotation of the beams 29 on their respective mounting axes is supplied by suitable drive motors 59, such as synchronous motors. The number of mounting units used to support and move the pipe 27 shown in FIG. 1 merely simplifies illustration. One skilled in the art may prefer to support the pipe at more frequent intervals. For example, the preferred embodiment utilizes 13 towers and associated mechanisms for each concentrator.

All of the drive motors 59 on a given concentrator are operated from a single motor control 61. Controlling such drive motors is a well known art. Consequently, the details of the control 61 are not set forth herein. A suitable servomechanism (not shown), also well known in the art, may be used in conjunction with the motor control 61 to coordinate the movement of the pipe 27 with the varying angle of the sun and, hence, the angle of incidence of the rays 21. For example, the art of driving a telescope with a drive and mechanism that compensates for the earth's rotation to cause the telescope to track a celestial object is well known, and the principles therein employed are preferably adapted for the concentrator 19. Although the apparent movement of the sun is in a predictable path, predictability need not be a requirement for the source of energy in utilizing the concentrator 19. It is known in the art how to track a source of radiation and how to cause response thereto.

Figure 9:
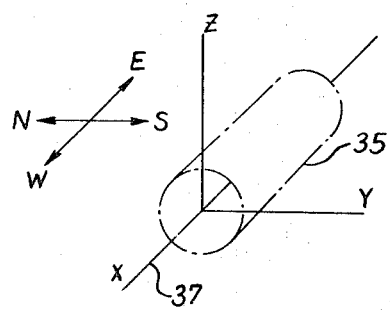
FIG. 9 is a graphical representation of the cylinder of reference of FIG. 1 with respect to axes in space, oriented directionally, and illustrating a plane of reference at right angles to the axis of the cylinder.

It is noted that the focus 26, although illustrated as a point, is a line which lies parallel to the axis 37 of the cylinder 35. The pipe 27 receives converged rays along its entire length. At any given instant, the sun has a certain fixed position with respect to a given point on the earth's surface. The angle of this position with respect to the given point may be divided into two components. To illustrate, refer first to FIG. 9 wherein the reference cylinder 35 is oriented longitudinally with respect to the east-west direction, and with respect to three spatial axes X, Y, and Z. The three axes are mutually at right angles to each other. The X axis, for the purpose of the graph, is coincident with the axis 37 of the cylinder 35. Hence, the Y and Z axes are in a plane which cuts the cylinder at right angles to its axis. In the present orientation, the YZ plane lies in a north-south direction.

Figure 10:
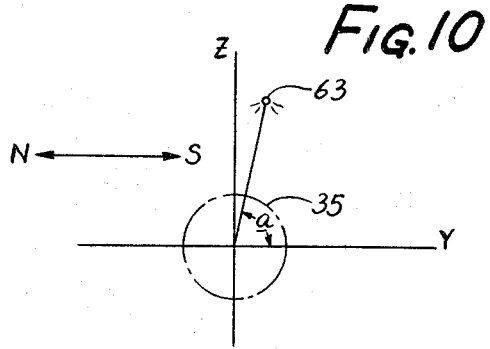
FIG. 10 is a graphical representation of the angle of the sun projected on the right angle plane of reference of FIG. 9, the angle being taken with respect to the horizontal.

In FIG. 10, the sun is represented at 63 and is illustrated with the YZ plane. The angle of the sun is taken with reference to the horizontal XY plane containing the axis 37 of the cylinder 35 at the intersection of the Y, Z axes. A line joining the sun and this intersection is projected onto the YZ plane. It will be noted that this projection of the sun forms an angle α with respect to the Y axis or the horizontal XY plane. It is this component of the sun's angular position with respect to the horizontal projected onto the YZ plane that, when reflected, determines a given point of the locus through which the focus moves. As the angle α varies with the position of the sun, the focus 26 (FIG. 5) moves through a plurality of successive points that define the locus. This locus determines the path of the focus.

Figure 11:
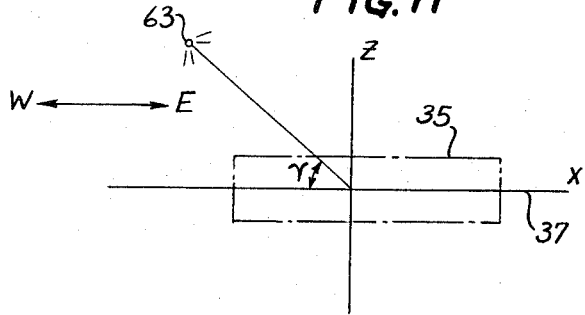
FIG. 11 is a graphical representation of the angle of the sun projected on a plane parallel to the cylinder of reference of FIG. 9, the angle being taken with respect to the horizontal.

The other component of the sun's angular position is illustrated in FIG. 11. There it will be noted that the longitudinal orientation of the cylinder 35 is parallel to the XZ plane. Hence, the graph of FIG. 11 is revolved 90° with respect to the graph of FIG. 10. It will be noted that the cylinder is still oriented longitudinally in the east-west direction. A line joining the sun 63 and the intersection of the X, Z axes when projected onto the XZ plane forms an angle $\gamma$ with respect to the X axis or horizontal XY plane. It can be proven that this component of the sun's angular position with respect to the horizontal, on the other hand, does not affect the movement of the focus 26 (FIG. 5) through its locus. Thus, the movement of the focus 26 in its locus is independent of the angle $\gamma$. It was mentioned previously that the focus 26 is linear. As the angle $\gamma$ varies, therefore, the converged rays move linearly along the line of the focus rather than at an angle to it.

Hence, it can be proven that the incident rays are converged by the reflector 22 at a focus which moves through a predetermined locus or path in response to the movement of the sun. This locus of the focus always lies on the reference cylinder regardless of the angle of the incident rays. A study of the limits of angle $\alpha$ (FIG. 10) is made for the geographical region in which the concentrator 19 is utilized. From this study, the limits of the locus of the focus 26 may be predetermined.

Figure 12:
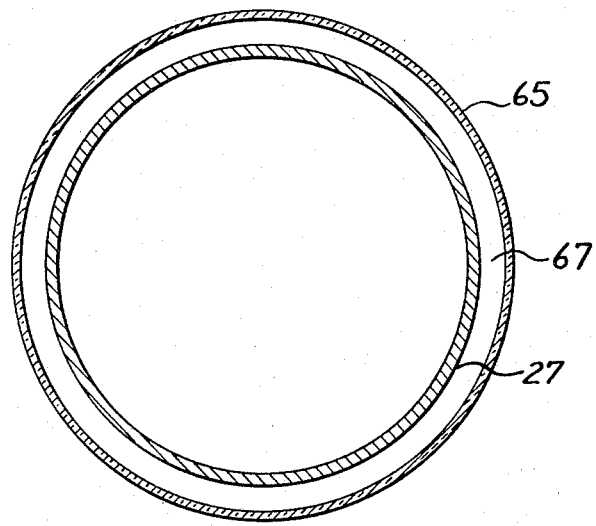
FIG. 12 is a cross sectional view of a portion of the concentrator of FIG. 1.

The pipe 27, as used in the preferred embodiment is essentially a boiler tube, and is of a type which has characteristics for boiling stability. Preferably, the pipe is of mild steel material. Other suitable material may be used, however. Suitable flow conditions and the exit steam temperature as familiar in the art are calculated for the pipe 27. This pipe is preferably insulated. For preferred operation, the insulation desirably has the characteristic of allowing radiant energy to enter the pipe 27, but insulating against heat loss by conduction and convection. One way of insulating the pipe 27 in accordance with this characteristic is illustrated in FIG. 12, where it is seen that the pipe 27 is completely enclosed in a larger diameter tube 65. The inside wall of the outside tube 65 is spaced apart from the outside wall of the pipe 27 for the purpose of providing a chamber 67 in which a vacuum is created. The outer tube 65 may be a thin walled glass tube. Such a tube permits the entrance of radiant energy, but in combination with the vacuum chamber 67, effectively prevents loss of heat by conduction and convection to the atmosphere. Of course, other suitable materials and/or other ways may be used to accomplish the insulation of the pipe 27.

Figure 13:
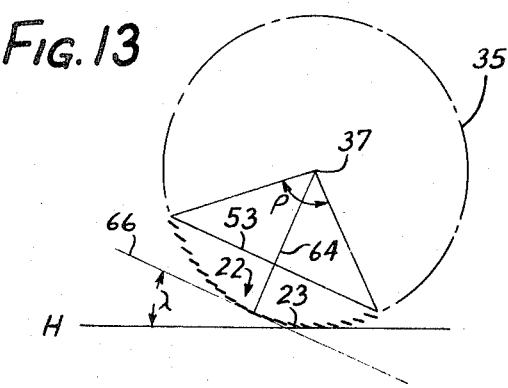
FIG. 13 is a graphical representation of the cylinder of reference of FIG. 8 rotated to an alternative position to incline the arrangement of reflective surfaces of the concentrator of FIG. 1.

To further utilize the solar rays in the concentrator, it may be desirable to incline the bed 25 so that the slats 23 will more directly face the sun for the greater part of the day. The ratio of slat width to step height (the difference in elevation between the surfaces of adjacent slats) is not a strong function of slat width so that regardless of slat width a certain fraction of light will shine on or be reflected into the step edges. When either direct rays or reflective rays strike these edges, the rays may not be converged upon the pipe 27 and their heating effect in the concentrator will be lost. In the present embodiment, it is estimated that less than 10 precent of the solar energy is lost in this manner. By inclining the entire bed 25 with respect to the horizontal H by an angle $\lambda$, as illustrated in FIG. 13, this loss may be diminished. A line 64 bisecting the angle $\rho$ equally divides the width of the primary reflector 22. The angle $\lambda$ lies between a tangent 66 (normal to the bisecting line 64) of the reference cylinder 35 at the lateral midpoint of the reflector 22 and a horizontal line H. One acceptable angle for $\lambda$ is 22 ½°. Other angles, or no inclination at all, may be desirable in view of surrounding circumstances. For example, an economic consideration, such as expense involved in overcoming a difficulty in reworking the local terrain when weighed against estimated losses in heating effect, may be determinative. Alternatively, an equivalent to the inclination may be achieved by inclining each slat by the desired angle rather than the entire bed. Thus, the general form of the bed would remain level. Such individual inclination would be from the basic position each slat otherwise occupies in accordance with the preferred embodiment.

Figure 14:
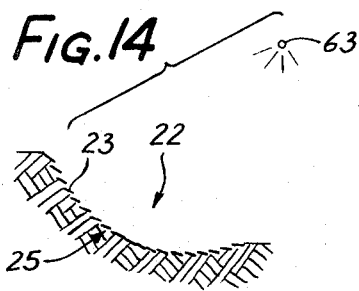
FIG. 14 is a fragmentary end view of the arrangement of reflective surfaces of the concentrator of FIG. 1 embedded in the earth and inclined toward the sun in accordance with the illustration of FIG. 13.

In FIG. 14, an alternative form of the reflector 22 is illustrated embodying the foregoing inclined bed 25. It will be noted that the bed is in the earth and inclined toward the sun 63 such that the side of the bed away from the sun is elevated slightly above the side of the bed toward the sun. In the northern hemisphere, this inclination would be toward the southern sky. In the southern hemisphere, on the other hand, the inclination would be toward the northern sky.

Reference is now made to a more specific description of a system according to the present invention in which the foregoing concentrator is employed. As illustrated in FIG. 2, a network 39 is formed of a plurality of concentrators in which the collector pipes 27 are tied together. The connections are so made that a line 41 carrying water plus steam joins the outside ends of the pipes 27, and a superheated steam line 43 joins the inside ends. For this purpose, a suitable flexible connector 68 (FIG. 1) is employed at either end of the pipe 27 to accommodate the movement of the pipe 27 when the line 41 and the superheated steam line 43 are stationary. As the water boils in the pipes 27 to produce steam, the steam moves through the steam line 43 and a superheated steam conduit 69. A branching of the conduit 69 divides the path of the steam so that part of the steam flows to the turbine 47 and part flows into the pebble bed 45. A suitable valve 71 is positioned at the branching of the superheated steam conduit 69. Alternatively, a suitable gate valve may be used at each connection of the superheated steam line 43 to each pipe 27. The primary function of such a valve is to allow the steam to flow freely from the network 39 to the turbine 47 and pebble bed 45 while restricting a flow in the reverse direction. The number of pipes 27 in the network 39 of FIG. 2 is illustrative only. Any suitable number may be employed. In the preferred embodiment, the total network 39 employs 124 moving pipes.

The pebble bed 45 according to the preferred embodiment of the system is a concrete walled pressure chamber 73 filled with gravel or crushed rock 75 or other suitable stone. Preferably, the walls are constructed to withstand 285 psig and to enclose a volume of 4,000 cubic yards. This chamber 73 may be constructed in an underground cavity. Preferably, one such chamber will be located subjacent or immediately below a network 39. The stone 75 that fills the pebble bed may have a void fraction of approximately 40 percent. The chamber 73, of course, must be sealed against loss of pressure. A water reservoir 51 provides a source for the supply water used in the system.

It is possible that a suitable underground cavity in natural rock could be utilized for the pressure chamber 73, provided the cavity walls could be suitably sealed against the loss of pressure. Alternatively, it is possible to construct the pressure chamber 73 above ground level.

The passage of steam under pressure into the pebble bed 45 during the production of steam in the network 39, heats the stones. During the heating phase, superheated steam flows into the bed and saturated steam flows out. The temperature difference between the superheated steam and the saturated steam determines the temperature rise of the pebble bed, since the heat of vaporization (condensation) cannot be used to heat the bed. A typical temperature rise is approximately 600°F. During periods when the sun is not available to produce steam in the network 39, the heat retained by the rocks 75 is utilized to produce steam for the operation of the turbine 47. This then becomes a boiling phase wherein water flows into the pebble bed, is boiled, and superheated steam flows out. In regions where sustained periods of inclement weather is anticipated, an alternative method of producing steam is to arrange a furnace 46, preferably fired by fossil fuel, adjacent the system as an auxiliary supply of heat for the pebble bed. This furnace is used only when there is insufficient heat stored in the pebble bed to produce steam for the operation of the turbine 47. While only one concentrator 19 is illustrated in FIG. 1, it will be understood that in the network 39 (FIG. 2), a plurality of such concentrators are adjacent each other, there being 124 in the network. An access lane 77 (FIG. 1) separates each concentrator in the network.

Useful work is extracted from the steam as it expands to drive the turbine 47, which in turn drives an electric generator (not shown) in a manner well known in the art. After the steam has expanded and its pressure reduced by its work within the turbine 47, it flows into a conventional condenser 49, which may include a cooling tower, where most of the steam is precipitated and returned to water. The water and some residual steam then flows through a conduit 79 to the line 41 of the network 39 for recirculation through the system.

The network 39 and its associated pebble bed forms a module that covers an area of approximately 1,500 feet by 1,800 feet. Several such modules may be combined as desirable to supply steam for one central turbo generator. For example, it is estimated that nine such modules will produce sufficient steam to operate a turbo-generator of 162 MW(e) capacity in a solar plant having a typical load factor of 50 percent. Desirably, the steam pressure for this system is 300 psia. One square foot of reflector surface is provided for every 8 watts of electrical generating capacity.

As indicated previously, a solar plant may be utilized for providing auxiliary power during a peak load requirement, such as caused by summer air conditioning. The solar plant, however, need not be limited as an auxiliary supply for the peak loads. It may be used to supply auxiliary power in the midrange of load curves, and it may be used to supply the entire power for a load curve. The size of a given system may be scaled either up or down as appropriate for the circumstances surrounding the application of the system.

Although the system shown and described herein employs steam as both coolant (i.e., the fluid that absorbs heat) and working fluid (i.e., the fluid that gives up heat) for the generating of electricity, other fluids may be utilized. For example, air could be used as the coolant and a heat transfer medium for the pebble bed. In such an instance, the pipes 27 would contain air to be heated and passed to the pebble bed. At the pebble bed, a heat exchanger (not shown) could be utilized between the hot air and a closed water system to heat the water and produce steam. Such a system would avoid the expanse of water travel through the entire network 39 with attendant possibilities for the entrance of impurities in the turbine steam.

Another possibility is to utilize air as both the coolant and working fluid. In this instance, gas turbines would be utilized to drive the generators. This system would avoid the need for the condenser 49, but would involve compressing the air and heating the compressed air to more than 1,300°F to achieve reasonable efficiency. Such a temperature could affect the material used for the pipe 27. Whereas a relatively inexpensive mild steel is usable where steam is the coolant and working fluid, a different material, such as fused quartz, would be required under the higher temperatures involved in a straight gas system.

Still another possibility is the use of $N_2O_4$ as the coolant and working fluid. This system, like the steam system, would require a cooling tower. A primary advantage is that the $N_2O_4$ disassociates at relatively low temperatures giving it a relatively high effective heat capacity. A turbine especially adapted to accommodate $N_2O_4$ would be utilized, however, rather than the conventional steam turbine.

EXAMPLE

An installation site is assumed for the construction of a system in accordance with the preferred embodiment which is near the Salton Sea in Southern California, latitude 33.3°N. The average intensity of the direct sunlight is calculated to be approximately 16 watts per square foot. The maximum heat rate, i.e., midday in summer, on a clear day is calculated to be approximately 85 watts per square foot, but a more reasonable maximum of 75 watts per square foot is selected for this example.

The reflector surface comprises silver under a thin layer of glass with a typical reflectance of 88 percent.

The collector pipe will typically absorb 90 percent of the reflected rays and re-radiate approximately 10 percent of the absorbed energy, thus retaining 90 percent of the absorbed energy. Based on these given figures the maximum collected heat rate is:

$75 \times 0.9 \times 0.9 \times 0.88 = 53.5$ watts per square foot.
The average collected heat rate is:

$16 \times 0.9 \times 0.9 \times 0.88 = 11.4$ watts per square foot.
A turbo-generator efficiency of 35 percent is typical. Thus, the average collected heat rate yields approximately 4 watts per square foot. The solar plant has a typical 50 percent load factor. Therefore, one square foot of reflector surface is required for each 8 watts of electrical generating capacity.

A solar plant for producing electrical power from concentrated solar energy is constructed in accordance with the system of FIG. 2, wherein the network 39 comprises 124 moving pipes 27. Each concentrator is constructed according to the embodiment of FIG. 1 and has a primary reflector that is approximately 28 feet wide and 750 feet long. The radius of curvature of the reflector is 20 feet. A 6 foot access lane is allowed between each reflector. Each slat of the reflector is approximately 2 inches wide. The width of each slat is inclined with respect to the horizontal by an angle equal to one-fourth of the angle taken at the center of curvature of the primary reflector between a line drawn from the center of curvature to the center of the width of the slat and a vertical plane containing the center of curvature. The total arc of the reflector subtends an angle of 90° at the center of curvature.

Each moving pipe is 6 inches OD and is enclosed in a glass tube of 7 inches ID. This permits a ½ inch chamber between tubes in which a vacuum is created. The towers 31 are conventional utility poles, each 20 feet long. The radial arms or beams 29 are 30 feet long and the counter weights 57 are 1,300 lbs. of poured concrete. For each concentrator 19 there are 13 towers and beams.

For the network 39 module, a concrete pressure chamber 73 is constructed in a cavity underground. The chamber has a capacity of 4,000 cubic yds. and is filled with gravel having a density of approximately 168 pounds per cubic foot, which yields approximately 40 percent in voids. The heat capacity of the gravel is approximately 0.2 Btu per pound. The concrete chamber is designed to withstand 285 psig. The steam pressure in the system is 300 psia.

Nine such modules are installed and 1,000°F steam is collected therefrom to flow to a central turbogenerator station having a capacity of 162 MW(e). The temperature rise in the gravel of the pressure chamber is 600°F.

As mentioned previously, the image reflected by the primary reflector 22 has a measurable width. Then the width of each slat adds to the overall width of the image, which corresponds substantially to the width of the pipe 27.

Figure 15:
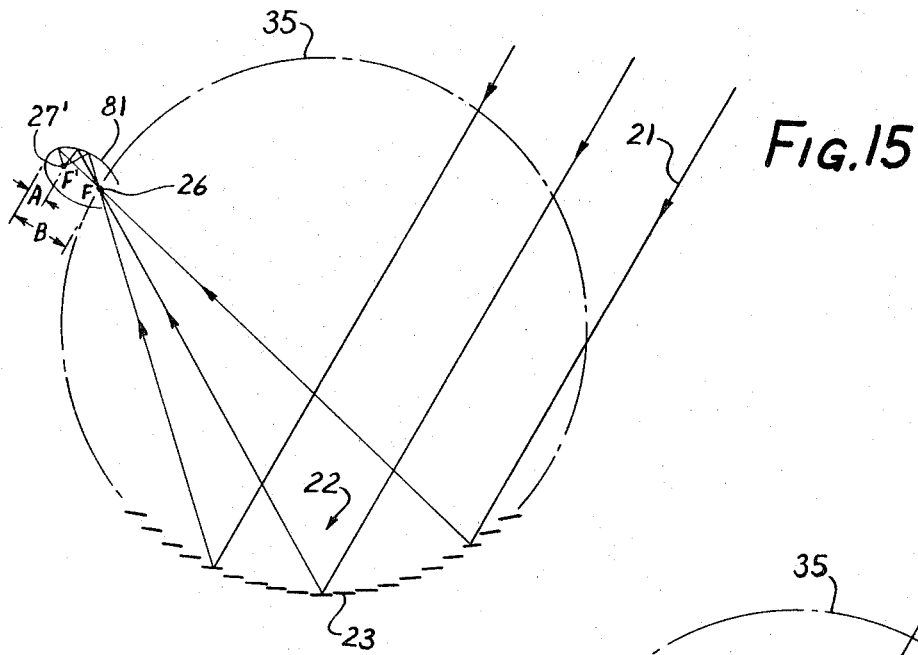
FIG. 15 is a diagrammatic view illustrating an alternative embodiment of the concentrator of FIG. 1 employing a secondary reflector for further concentrating the image of the primary reflector.

An alternative to the preferred embodiment heretofore described, is to reduce the image by using a secondary reflector disposed substantially at the focus 26. In FIG. 15, a secondary reflective surface in the form of an elliptical mirror 81 is disposed to move approximately along the surface of the reference cylinder 35 to further reduce the optical image transferred to it from the primary reflector 22. The elliptical mirror 81 has two foci, F and F'. The curve of the mirror is incomplete at one end to permit the entrance of the converged rays reflected from the primary reflector 22. The mirror is disposed such that its focus F coincides substantially with focus 26 on the surface of the reference cylinder 35. This disposition may be accomplished by suitably attaching the elliptical mirror 81 to the outer end of the rotating radial arm 29 such that a plane containing the radial arm 29 passes through foci F, F' of the secondary reflector 81.

Because of the basic laws of optics, the image at F is reflected to F', and its effective size is reduced approximately in proportion to the ratio of the lengths of A to B. Such further concentration of the reflected rays results in higher temperature densities, which may be useful to obtain certain chemical reactions or for other purposes where higher temperatures are desired. The target pipe 27' is located at F' and can be of considerably smaller size than the pipe 27 of the embodiment of FIG. 1. The extent of size reduction will depend upon the specific parameters used for image reduction. Although such a secondary reflector adds expense, it may be justified by the higher temperature densities achievable. Part of the expense may be offset by the smaller target pipe.

Figure 16:
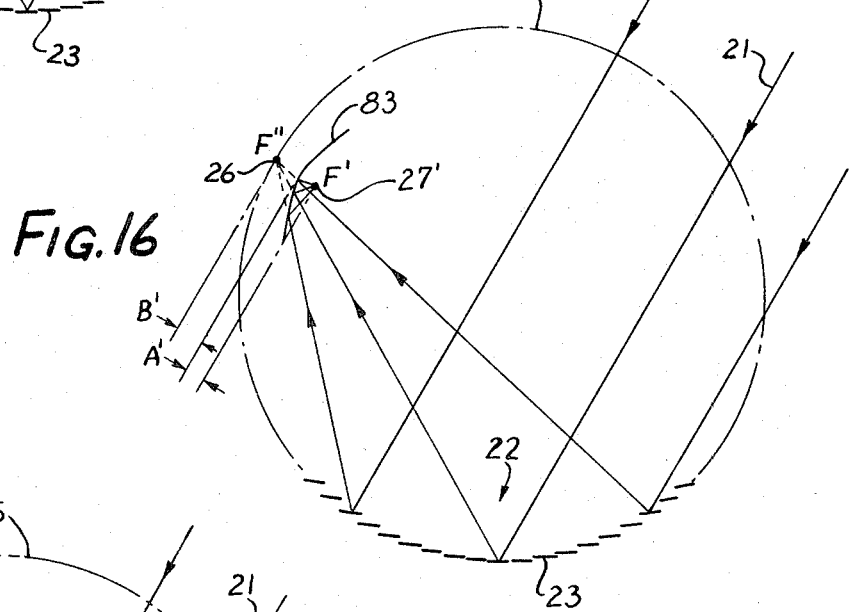
FIG. 16 is a diagrammatic view illustrating the embodiment of FIG. 15 employing an alternative secondary reflector.

Another embodiment employing a secondary reflector is illustrated in FIG. 16. Here the secondary reflector is in the form of a concave hyperbolic mirror 83. In this instance, the mirror 83 is spaced inwardly of the reference cylinder 35 such that the focus F'' of the virtual image coincides with the focus 26 of the otherwise real image of the embodiment of FIG. 1 on the surface of the cylinder 35. The real image of the mirror 83 is focused at F', and the target pipe 27' is disposed in coincidence therwith. The target pipe 27' may be smaller than the target pipe 27 of the embodiment of FIG. 1, because the image of the secondary mirror 83 will be reduced in size approximately in proportion to the ratio of lengths of A' to B' (FIG. 16). Thus, the results are similar to the first mentioned alternative embodiment employing the elliptical shape secondary mirror 81. A primary advantage of the hyperbolic secondary reflector 83 is that shorter radial arms 29 may be utilized. This is noted by the mirror 83 being spaced inwardly of the surface of the reference cylinder 35. There may be, however, some light lost at the extremes of the radial arm position.

Figure 17:
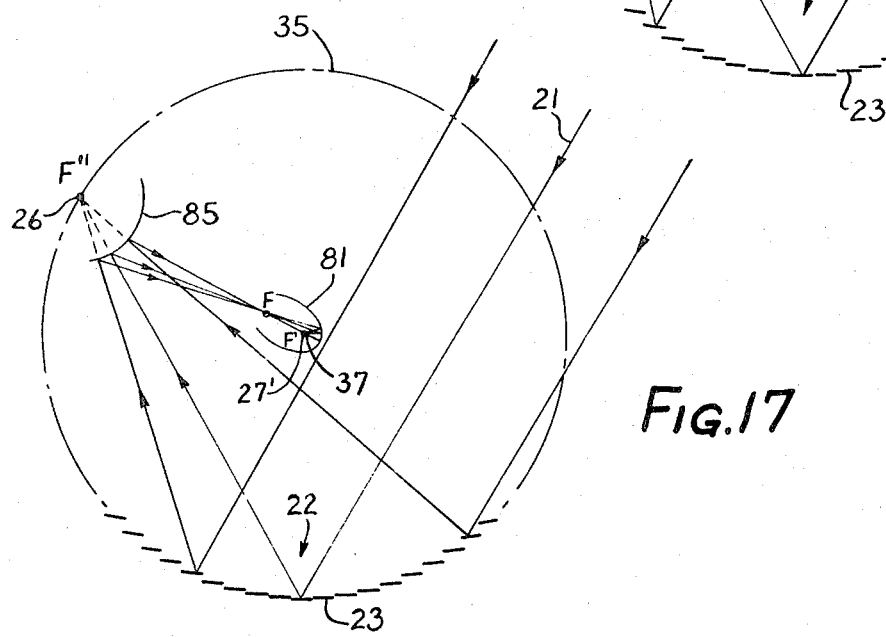
FIG. 17 is a diagrammatic view illustrating an alternative embodiment of the concentrator of FIG. 1 employing a combination of secondary reflectors for further concentrating the image of the primary reflector.

Yet another embodiment is seen in FIG. 17 wherein a combination of secondary reflectors is employed. In this embodiment, the optical energy is translated from the focus 26 on the reference cylinder to another position along the radial arm 29 by a plurality of reflectors that are fixed in relation to each radial arm. In the illustration, a first of the combination of secondary reflectors is in the form of a convex hyperbolic mirror 85, which is disposed inwardly of the surface of the reference cylinder 35. In this instance, the focus 26 of the embodiment of FIG. 1 on the surface of the reference cylinder is now the virtual image F'' of the mirror 85. The real image of the mirror 85 occurs at F. An elliptical mirror 81 having its open end directed to receive the reflected rays from the mirror 85 is disposed along the radial arm 29 so that one of its two foci coincides with the real image of the mirror 85. The light from the image at F, by the basic laws of optics, is further reflected to the other focus F' of the elliptical mirror 81. The target pipe 27' is then disposed to coincide with F' of the mirror 81. By selecting certain perdetermined parameters, such as the curvature of the mirror 85 and that of the mirror 81, the final image at F' can be made to coincide with the axis 37 of the reference cylinder 35. The advantage of this particular configuration, is that the target pipe 27' can be disposed in a fixed position while the radial arms 29 support and move the secondary mirrors about the pipe to continuously provide a focus of the radiant energy on the pipe. Of course, with each additional reflector, there will be some losses of optical energy as well as some shadowing of the reflection from the primary reflector 22.

It is recognized that it may be desirable to add further refinements to these alternative embodiments, such as providing the secondary reflectors with movable mounts and appropriate drives to readjust the angle of the secondary mirrors with respect to the radial arms 29 to change the effective length of the radial arm and thereby obtain a secondary concentration at any desired position along the radial arm. Along with such a variation, it may be desirable to obtain a secondary concentration from more than one adjacent concentrator and translate each to a common target pipe 27' on a given concentrator. The advantage of higher temperatures achievable by translating a secondary focus from one concentrator to another or from a system of others may offset the additional cost of the drives and movable mountings of the secondary reflectors.

Alternative embodiments, such as the foregoing, are provided for utilization in instances where temperatures required for some forms of process heat will be achievable by the additional level of concentration over that obtainable by the single primary reflector and moving arm system. Since the secondary reflectors can be fixed with respect to their mounting radial arms and since they are considerably smaller than the primary reflector in surface area, even a concentrator utilizing the secondary reflectors will provide significant advantages over prior art systems which require the steering of the primary reflectors.

Such further concentration with secondary reflectors, as mentioned previously, raises the power densities achievable in the concentrator. Thus, it may be possible to utilize liquid metal coolants, and, in certain types of chemical processes, the reacting chemicals themselves as coolants.

In summary, there has been presented a method of concentrating the heating effect of rays emitted from a source of energy which moves in a path and a concentrator for accomplishing the method. An example of a source of energy is the sun relative to the earth's rotation, on which the preferred embodiment is predicated. The rays 21 are reflected by a primary reflector 22 and converged on a focus 26, which moves in a predetermined path in response to the rotation of the earth with respect to the sun. The reflector 22 is fixed, at least during reflecting. A target in the form of a pipe 27 is provided to move in coincidence with the moving focus to receive the converged rays. The pipe 27 lies longitudinally of a linear focus parallel to the axis 37 of a cylinder of reference 35 generated about the axis and having the radius of curvature of the reflector 22 as the radius of the cylinder. The reflector 22 is formed of a plurality of slats 23 disposed adjacent each other along the center of curvature of the reflector 22 and parallel to the axis 37. The reflective surfaces of the slats face inwardly of the reference cylinder. The disposition of each independent slat is such that the focal length of the primary reflector 22 is twice the radius of curvature, rather than one-half the radius of curvature that is conventional for a concave spherical smooth reflector. Thus, the focus 26 lies on the surface of another portion of the cylinder generally opposite the reflector 22. The pipe 27 is mounted to move along this portion of the cylindrical surface, which is predetermined to be the path of movement of the linear focus 26. Synchronizing means causes the pipe 27 to move in coincidence with the linear focus 26, thereby collecting the heating affect of the converged rays even though the incident rays are striking at continuously varying angles because of the earth's rotation. Alternative embodiments employ smaller, specialized secondary reflectors to further reduce the image and increase the temperature densities achievable at the target pipe. The concentrator, of course, is usable with sources of energy other than the sun.

The application further sets forth a system for employing both the foregoing method and the concentrator of the method to produce useful work, such as the production of electrical power. A plurality of such concentrators 19 are connected in a network 39. Steam from each concentrator is collected and passed to a turbine 47 and to a pebble bed 45. The pebble bed 45 stores energy which is used to drive the steam turbine 47 when the sun is not available as an energy source. The pebble bed comprises a concrete pressure chamber 73 filled with gravel or crushed stone 75. The steam causes the temperature of the stones to rise. The stones produce steam in giving back the temperature to the system when the network 39 does not provide steam in the system. For geographical regions in which extended periods of inclement weather may be anticipated, an auxiliary heater in the form of a furnace 46 fired by fossil fuel is utilized to heat the rocks. A water reservoir 51 is used as a source of supply of water for the system.

After performing its work in driving the steam turbine 47, the spent steam is passed through a conventional condensor 49 where the steam is precipitated back to the form of water, which is recirculated through the network 39.

The system may employ alternative fluids as both coolant and working fluids. Some examples are air and other gases and $N_2O_4$. Further, in addition to employing the system for the production of electricity, it may be used for such purposes as the production of hydrogen and oxygen from water, metallurgical processes, chemical processes, laboratory work, and the gasification of coal and oil.

Thus, it is apparent that there has been provided, in accordance with the invention, a method of concentrating the heating effect of radiant energy, a concentrator for accomplishing the method, and a system for utilizing the concentrator and the method in the production of useful work. While the invention has been described in conjunction with specific embodiments thereof, it is evident that many alternatives, modifications, and variations will be apparent to those skilled in the art in view of the foregoing description. Accordingly, it is intended to embrace all such alternatives, modifications, and variations as fall within the spirit and scope of the appended claims.

Various features of the invention are set forth in the following claims.

What is claimed is:

1. A method of concentrating the heating effect of rays emitted from a source of energy moving in a path, comprising the steps of providing a plurality of linear primary reflective surfaces, reflecting the rays, converging the reflected rays on a linear focus which moves in a predetermined path in response to the movement of the energy source, providing a linear target to receive the converged rays, and moving the target in coincidence with said focus as it moves in its predetermined path.

2. The method in accordance with claim 1 wherein the step of reflecting the rays includes disposing the primary reflective surfaces along a first portion of the surface of a cylinder generated about an axis which (a) has a given orientation and (b) lies in a given first plane, said plurality of reflective surfaces being independent of each other and disposed with their reflective surfaces facing the interior of the cylinder and each being inclined with respect to said first plane such that the reflected rays are directed toward said focus.

3. The method in accordance with claim 2 wherein the step of converging the reflected rays includes relating the disposition of each of the inclined primary reflective surfaces in a fixed relation during reflecting such that the rays always converge to an image at said focus and cause the focus to move in said predetermined path in response to the moving of said source in its path.

4. The method in accordance with claim 3 wherein said predetermined path is a locus of points coincident with a second portion of the surface of said cylinder, said second portion of the surface being generally opposite on said cylinder of said first portion.

5. The method in accordance with claim 4 wherein said plurality of primary reflective surfaces are in the form of slats which are disposed longitudinally and adjacent one another on said first portion of said cylindrical surface such that they lie parallel to the axis of said cylinder and wherein said focus is along a line parallel to the axis on said second portion of said cylindrical surface.

6. The method in accordance with claim 5 wherein the inclination of each slat with respect to said first plane is by an angle equal to one-quarter of the position angle of each slat with respect to a second plane (a) also containing the axis of said cylinder and (b) being normal to said given first plane, said position angle of each slat being that angle which lies between said second plane and a line connecting the center of the width of each slat to the axis of said cylinder.

7. The method in accordance with claim 5 wherein said target is a pipe disposed parallel to said axis and in coincidence with said locus and the moving of the target includes supporting said pipe on a plurality of radial arms pivoted at the axis of said cylinder so that said pipe is movable along said locus.

8. The method in accordance with claim 7 wherein the moving of the target further includes applying power to said radial arms to cause them to rotate about said pivot points and synchronizing the rotative movement to automatically effect coincidence between the movement of the pipe and that of the linear focus as it moves in its locus.

9. The method in accordance with claim 5 wherein said primary reflective surfaces cause said focus to move in said predetermined path only in response to the varying of a component of the angle of the energy source with respect to said first plane, said component being that which results from projecting a line connecting the axis of said cylinder to the energy source onto a plane that is perpendicular to the axis of said cylinder.

10. The method in accordance with claim 3 wherein the source of energy is the sun and its movement is relative to the rotation of the earth so that the rays emitted from the sun are incident upon the surface of the earth in continuously varying angles.

11. The method in accordance with claim 10 wherein the given orientation is generally along an east-west line and the given first plane is a horizontal plane.

12. The method in accordance with claim 11 wherein said primary reflective surfaces cause said focus to move along said locus only in response to the varying of a component of the angle of the sun with respect to the horizontal, said component being that which results from projecting a line connecting the axis of said cylinder to the sun onto a plane that is perpendicular to the axis of said cylinder.

13. The method in accordance with claim 3 wherein a secondary reflective surface is disposed substantially at said focus in a manner to move in coincidence therewith to reduce the reflected image from said primary reflective surfaces and further concentrate the heating effect of the rays on said target.

14. The method in accordance with claim 13 wherein said secondary reflective surface is elliptical in form.

15. The method in accordance with claim 13 wherein said secondary reflective surface is hyperbolic in form and is disposed inwardly of said focus between said focus and said primary reflective surfaces.

16. The method in accordance with claim 10 wherein the concentrated heat is used to derive useful work and further comprises the step of storing heat from a portion of the concentrated heat in a stone-filled chamber so that a reserve supply of energy is available when the sun is not available as an energy source.

17. The method in accordance with claim 10 wherein the concentrated heat is used for the production of electrical power and further comprises the steps of supplying the target with water to produce steam and deriving work from the steam to operate electrical generating apparatus.

18. The method in accordance with claim 10 wherein the concentrated heat is used for the production of electrical power and further comprises the steps of supplying the target with air, exchanging the heat from the air to produce steam, and deriving work from the steam to operate electrical generating apparatus.

19. The method in accordance with claim 10 wherein the concentrated heat is used for the production of electrical power and further comprises the steps of supplying the target with compressed gas and deriving work from the heated compressed gas to operate electrical generating apparatus.

20. The method in accordance with claim 10 wherein the concentrated heat is used for the production of electrical power and further comprises the steps of supplying the target with $N_2O_4$ to operate electrical generating apparatus.

21. The method in accordance with claim 10 wherein the concentrated heat is used for the decomposition of water into $H_2$ and $O_2$.

22. The method in accordance with claim 10 wherein the concentrated heat is used for metallurgical processes.

23. The method in accordance with claim 10 wherein the concentrated heat is used for gasification of coal and oil.

24. The method in accordance with claim 10 wherein the concentrated heat is used for chemical processes.

25. The method in accordance with claim 10 wherein the concentrated heat is used for laboratory purposes.

26. A method of concentrating the heating effect of rays emitted from a source of energy moving in a path, comprising the steps of providing a plurality of linear primary reflective surfaces, reflecting the rays, converging the reflected rays to an image at a first linear focus which moves in a predetermined path in response to the movement of the energy source, reflecting the image of said first focus and converging the reflected rays to an image at a second linear focus as said first focus moves in its predetermined path, the image at said second focus being reduced in size from that of said first focus, and providing a linear target to receive the converged rays at said second focus.

27. The method in accordance with claim 26 wherein the step of reflecting the rays includes disposing the primary reflective surfaces along a first portion of the surface of a cylinder generated about an axis which (a) has a given orientation and (b) lies in a given first plane, said plurality of reflected surfaces being independent of each other and disposed with their reflective surfaces facing the interior of the cylinder, each surface being inclined with respect to said first plane such that the reflected rays are directed toward the image at said first focus and the step of converging the reflected rays to the image at said first focus includes disposing the inclined primary reflective surfaces in a fixed relation during reflecting such that the rays always converge to the image at said first focus and cause said first focus to move in said predetermined path in response to the moving of the energy source in its path.

28. The method in accordance with claim 27 wherein said predetermined path is a locus of points coincident with a second portion of the surface of said cylinder, said second portion being generally opposite on said cylinder of said first portion, wherein said plurality of primary reflective surfaces are in the form of slats which are disposed longitudinally and adjacent one another on said first portion of said cylindrical surface such that they lie parallel to said axis, and wherein said focus is along a line parallel to said axis on said second portion of said cylindrical surface.

29. The method in accordance with claim 28 wherein the inclination of each slat with respect to said first plane is by an angle equal to one-quarter of the position angle of each slat with respect to a second plane (a) also containing the axis of said cylinder and (b) being normal to said given first plane, said position angle of each slat being that angle which lies between said second plane and a line connecting the center of the width of each slat to the axis of said cylinder.

30. The method in accordance with claim 27 wherein the step of reflecting the image of said first focus and converging the reflected rays to an image at said second focus includes a secondary reflective surface having an elliptical form with two foci, said second reflective surface being disposed with one of its two foci being substantially in coincidence with the image of said first focus and wherein said target is disposed to move in coincidence with the other of the two foci of said secondary reflective surface.

31. The method in accordance with claim 27 wherein the step of reflecting the image of said first focus and converging the reflected rays to an image at said second focus includes a secondary reflective surface having an hyperbolic form disposed so that said first focus is the virtual image of said secondary reflective surface and said second focus coincides with the real image of said secondary reflective surface and wherein said target is disposed to move substantially in coincidence with the real image of said secondary reflective surface.

32. A method in accordance with claim 27 wherein said target is fixed at the axis of said cylinder and wherein the step of reflecting the image of said first focus and converging the reflected rays to an image at said second focus includes two secondary reflective surfaces disposed so that one of said secondary reflective surfaces moves substantially in coincidence with said first focus as said first focus moves in said predetermined path and reflects the image to the other of said secondary reflective surfaces, the other of said reflective surfaces being disposed to move rotatably to always receive, reflect, and converge the reflected rays to an image at said second focus in coincidence with said fixed target.

33. The method in accordance with claim 32 wherein more than two of said secondary reflective surfaces are related to each other such that the images from more than one such arrangement of primary reflective surfaces is translated to only a single common target fixed at one such axis.

34. A concentrator for concentrating the heating effect of rays emitted from a source of energy moving in a path, comprising an arrangement of a plurality of linear reflective surfaces for reflecting the rays and converging the reflected rays at a linear focus which moves in a predetermined path in response to the movement of the source of energy in its path, linear means for receiving the converged rays, means for moving said receiving means in said predetermined path, and means for synchronizing the movement of said receiving means with said focus as said focus moves in said predetermined path.

35. The concentrator in accordance with claim 34 wherein said primary reflective surfaces are disposed along a first portion of the surface of a cylinder generated about an axis which (a) has a given orientation and (b) lies in a given first plane, said plurality of reflective surfaces being independent of each other and being disposed with their reflective surfaces facing the interior of the cylinder, each surface being inclined with respect to said first plane such that the reflected rays are directed toward said focus as it moves in said predetermined path, the disposition of the surfaces being fixed during reflecting so that the rays always converge at and cause said focus to move in said predetermined path in response to the moving of the energy source in its path.

36. The concentrator in accordance with claim 35 wherein said predetermined path is a locus of points coincident with a second portion of the surface of said cylinder, said second portion being generally opposite on said cylinder of said first portion, wherein said plurality of primary reflective surfaces are in the form of slats which are disposed longitudinally of said cylinder and adjacent one another on said first portion of said cylindrical surface such that they lie parallel to the axis of said cylinder, and wherein said focus is along a line parallel to the axis on said second portion of said cylindrical surface.

37. The concentrator in accordance with claim 36 wherein the inclination of each slat with respect to said first plane is by an angle equal to one-quarter of the position angle of each slat with respect to a second plane (a) also containing the axis of said cylinder and (b) being normal to said given first plane, said position angle of each slat being that angle which lies between said second plane and a line connecting the center of the width of each slat to the axis of said cylinder.

38. The concentrator in accordance with claim 34 wherein the means for receiving the collected rays is a pipe disposed parallel to said axis through which a fluid is passable.

39. The concentrator in accordance with claim 38 wherein said pipe is enclosed in a transparent tube, said tube being oversized and causing a space to exist between the inside of the tube wall and the outside of the pipe wall.

40. The concentrator in accordance with claim 39 wherein a vacuum is created in said space between the pipe and the tube.

41. The concentrator in accordance with claim 34 wherein said means for moving said receiving means in said predetermined path includes a plurality of radial arms for supporting said receiving means, said arms being pivotally connected at the axis of said cylinder to other supports so that said receiving means is movable along said predetermined path.

42. The concentrator in accordance with claim 34 wherein said synchronizing means is a servomechanism to control the movement of said receiving means automatically in coincidence with the movement of said focus as said focus moves in said predetermined path.

43. The concentrator in accordance with claim 37 wherein the source of energy is the sun and its movement is relative to the rotation of the earth so that the rays emitted from the sun are incident upon the surface of the earth in continuously varying angles.

44. The concentrator in accordance with claim 43 wherein the given orientation is generally along an east-west line and the given first plane is a horizontal plane.

45. The concentrator in accordance with claim 44 wherein said slats are embedded in the earth's surface in said arrangement.

46. A concentrator in accordance with claim 44 wherein said arrangement of slats is laterally inclined as a unit, the slats on the side of the arrangement away from the sun for the substantial part of the day being elevated above the slats on the side of the arrangement toward the sun such that a tangent at the lateral midpoint of the arrangement is inclined with respect to the horizontal by a predetermined angle.

47. A concentrator in accordance with claim 44 wherein all slats of said arrangement while disposed in their respective position angles are tilted from their angles with respect to the horizontal by an equal amount toward the direction occupied by the sun for the substantial part of the day.

48. A concentrator for concentrating the heating effect of rays emitted from a source of energy moving in a path, comprising an arrangement of a plurality of linear primary reflective surfaces for reflecting the rays and converging the reflected rays to an image at a first linear focus which moves in a predetermined path in response to the movement of the energy source in its path, means for reflecting the image of said first focus and converging the reflected rays to an image at a second linear focus as said first focus moves in its predetermined path, the image at said second focus being reduced in size from that of said first focus, linear means for receiving the converged rays at said second focus, means for moving said first focus reflecting and converging means in said predetermined path, and means for synchronizing the movement of said first focus reflecting and converging means with the image of said first focus as said first focus moves in said predetermined path.

49. The concentrator in accordance with claim 48 wherein said primary reflective surfaces are disposed along a first portion of the surface of a cylinder generated about an axis which (a) has a given orientation and (b) lies in a given first plane, said plurality of reflective surfaces being independent of each other and being disposed with their reflective surfaces facing the interior of the cylinder, each surface being inclined with respect to said first plane such that the reflected rays are directed toward said first focus as it moves in said predetermined path, the disposition of the surfaces being fixed during reflecting so that the rays always converge at and cause said first focus to move in said predetermined path in response to the moving of the energy source in its path.

50. The concentrator in accordance with claim 49 wherein said predetermined path is a locus of points coincident with a second portion of the surface of said cylinder, said second portion being generally opposite on said cylinder of said first portion, wherein said plurality of primary reflective surfaces are in the form of slats which are disposed longitudinally of said cylinder and adjacent one another on said first portion of said cylindrical surface such that they lie parallel to the axis of said cylinder, and wherein said focus is along a line parallel to the axis on said second portion of said cylindrical surface.

51. The concentrator in accordance with claim 50 wherein the inclination of each slat with respect to said first plane is by an angle equal to one-quarter of the position angle of each slat with respect to a second plane (a) also containing the axis of said cylinder and (b) being normal to said given first plane, said position angle of each slat being that angle which lies between said second plane and a line connecting the center of the width of each slat to the axis of said cylinder.

52. The concentrator in accordance with claim 50 wherein said means for reflecting the image of said first focus and converging the reflected rays to an image at said second focus includes a secondary reflective surface having an elliptical form with two foci, said second reflective surface being disposed with one of its two foci substantially in coincidence with the image of said first focus and wherein said means for receiving the converged rays at said second focus is disposed to move in coincidence with the other of the two foci of said secondary reflective surface.

53. The concentrator in accordance with claim 50 wherein said means for reflecting the image of said first focus and converging the reflected rays to an image at said second focus includes a secondary reflective surface having an hyperbolic form disposed so that said first focus is the virtual image of said secondary reflective surface and said second focus coincides with the real image of said secondary reflective surface and wherein said means for receiving the converged rays at said second focus is disposed to move substantially in coincidence with the real image of said secondary focus.

54. The concentrator in accordance with claim 50 wherein said means for receiving the converged rays at said second focus is fixed at the axis of said cylinder and wherein said means for reflecting the image of said first focus and converging the reflective rays to an image at said second focus includes two secondary reflective surfaces disposed so that one of said secondary reflective surfaces moves in coincidence with said first focus as it moves in said predetermined path and reflects the image to the other of said secondary reflective surfaces, said other of said secondary reflective surfaces being disposed to move rotatably to always receive the image reflected from said first focus and to reflect and converge the reflected rays to an image at said second focus in coincidence with said fixed receiving means.

55. The concentrator in accordance with claim 54 wherein more than two of said secondary reflective surfaces are related to each other such that the images from more than one such arrangement of primary reflective surfaces is translated to only a single common target fixed at one such axis.

56. A concentrator for concentrating the heating effect of rays emitted from a source of energy, comprising a primary reflector of essentially planar slats having reflective surfaces, said slats being disposed longitudinally adjacent one another along a first portion of the surface of a cylinder, said reflective surfaces facing the interior of said cylinder and their orientation being such that essentially parallel rays impinging on said reflective surfaces are focused along a line extending parallel to the axis of said cylinder and lying on a second portion of the surface of said cylinder, said second portion being essentially opposite on said cylinder of said first portion.

57. The concentrator in accordance with claim 56 further comprising a secondary reflector disposed adjacent the focus for translating and further concentrating the heating effect of the rays.

58. In a concentrator for concentrating the heating effect of rays emitted from a source of energy moving in a path, a reflector having a focal length of twice the radius of general curvature of said reflector for reflecting and converging the reflected rays to an image at a focus which moves in a predetermined path in response to the movement of the energy source in its path, said reflector comprising an arrangement of a plurality of reflective surfaces, said arrangement being disposed along a first portion of the surface of a cylinder having as its radius the radius of general curvature and being generated about an axis which (a) has a given orientation and (b) lies in a given first plane, said plurality of reflective surfaces being independent of each other and being disposed with their reflective surfaces facing the interior of the cylinder, each surface being inclined with respect to said first plane such that the reflected rays are directed toward said focus as it moves in said predetermined path, the disposition of the surfaces being fixed during reflecting so that the rays always converge at and cause said focus to move in said predetermined path in response to the moving of the energy source in its path.

59. The reflector in accordance with claim 58 wherein said predetermined path is a locus of points coincident with a second portion of the surface of said cylinder, said second portion being generally opposite on said cylinder of said first portion, wherein said plurality of primary reflective surfaces are in the form of salts which are disposed longitudinally of said cylinder and adjacent one another on said first portion of said cylindrical surface such that they lie parallel to the axis of said cylinder, and wherein said focus is along a line parallel to the axis on said second portion of said cylindrical surface.

60. The reflector in accordance with claim 59 wherein the inclination of each slat with respect to said first plane is by an angle equal to one-quarter of the position angle of each slat with respect to a second plane (a) also containing the axis of said cylinder and (b) being normal to said given first plane, said position angle of each slat being that angle which lies between said second plane and a line connecting the center of the width of each slat to the axis of said cylinder.

* * * * *